United States Patent
Coles et al.

(10) Patent No.: US 9,099,785 B2
(45) Date of Patent: Aug. 4, 2015

(54) REDUCING RF ENERGY LEAKAGE BETWEEN BATTERY AND PCB

(71) Applicant: MOTOROLA MOBILITY LLC, Libertyville, IL (US)

(72) Inventors: Katherine H. Coles, Libertyville, IL (US); Vijay L. Asrani, Round Lake, IL (US); David R. Vogel, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 243 days.

(21) Appl. No.: 13/721,561

(22) Filed: Dec. 20, 2012

(65) Prior Publication Data
US 2014/0176387 A1 Jun. 26, 2014

(51) Int. Cl.
*H01Q 1/52* (2006.01)
*H01Q 1/24* (2006.01)
*H04M 1/02* (2006.01)

(52) U.S. Cl.
CPC .............. *H01Q 1/526* (2013.01); *H01Q 1/243* (2013.01); *H04M 1/0262* (2013.01)

(58) Field of Classification Search
CPC ............................. H01Q 1/243; H01Q 1/526
USPC ................................................ 343/841, 702
See application file for complete search history.

(56) References Cited

U.S. PATENT DOCUMENTS

| 7,471,249 B2 | 12/2008 | Tang et al. |
| 7,903,034 B2 | 3/2011 | Anguera et al. |
| 2005/0241954 A1 | 11/2005 | Iwanami |
| 2007/0069961 A1* | 3/2007 | Akiho et al. ................. 343/702 |
| 2008/0161069 A1 | 7/2008 | Hankui |
| 2012/0194997 A1 | 8/2012 | McClure et al. |

FOREIGN PATENT DOCUMENTS

| EP | 1367803 A2 | 12/2003 |
| GB | 2330964 A | 5/1999 |
| WO | WO 2008/136238 A1 | 11/2008 |

OTHER PUBLICATIONS

European Patent Office, International Search Report and the Written Opinion in International Patent Application No. PCT/US2013/073813 (May 27, 2014).

* cited by examiner

*Primary Examiner* — Hoang V Nguyen
(74) *Attorney, Agent, or Firm* — Leydig, Voit & Mayer, Ltd.

(57) ABSTRACT

An improved system 100 and method of reducing RF energy leakage from being trapped in a gap (cavity) 178 between a battery 102 and printed circuit board (PCB) 104 in an electronic communications device 106 is provided by a RF shield assembly that can extend between the battery and the PCB. The RF shield assembly can comprise a conductive wrap 168 and conductive foam 170 connected to metal pads 138 and 140 along the ground plane 136 of the PCB 104.

19 Claims, 9 Drawing Sheets

REDUCING RF ENERGY LEAKAGE BETWEEN BATTERY AND PCB

BACKGROUND OF THE INVENTION

1. Field of the Disclosure

The disclosure relates in general to electronic communications devices and more particularly to an electronic communications device, such as a mobile phone, with an antenna positioned near a battery such that radio frequency (RF) energy is trapped between the battery and a printed circuit board (PCB) in the electronic communications device.

2. Background Art

In older electronic devices, such as conventional mobile phones like KRAZR, PEBL, Droid Razr and others, the battery sits inside a grounded, metal "bath tub" or a grounded metal chassis which required extra space. This can cause the older phones to be larger. Furthermore, such chassis and parts are expensive to produce and additional spring contacts are often required for grounding. Moreover, the metal chassis is not always able to ground frequently enough to provide solid battery isolation due to screw bosses and other mechanical limitations. Also, the metal chassis takes away additional space from the antenna volume.

Many newer electronic communications device, such as recent cellular phones and tablets have borderless display designs with decreased antenna volume, which brings the antenna closer to the battery. If the battery is not well isolated, RF energy from antennas can get caught between the battery and PCB. This causes cavity resonances at undesired frequencies, often in the bands of interest, which degrades antenna performance and performance of the electronic communications device.

It is, therefore, desirable to provide an improved system and method of reducing RF energy leakage between a battery and PCB, which overcomes most, if not all, of the preceding disadvantages.

DETAILED DESCRIPTION OF THE INVENTION

Figure 1:
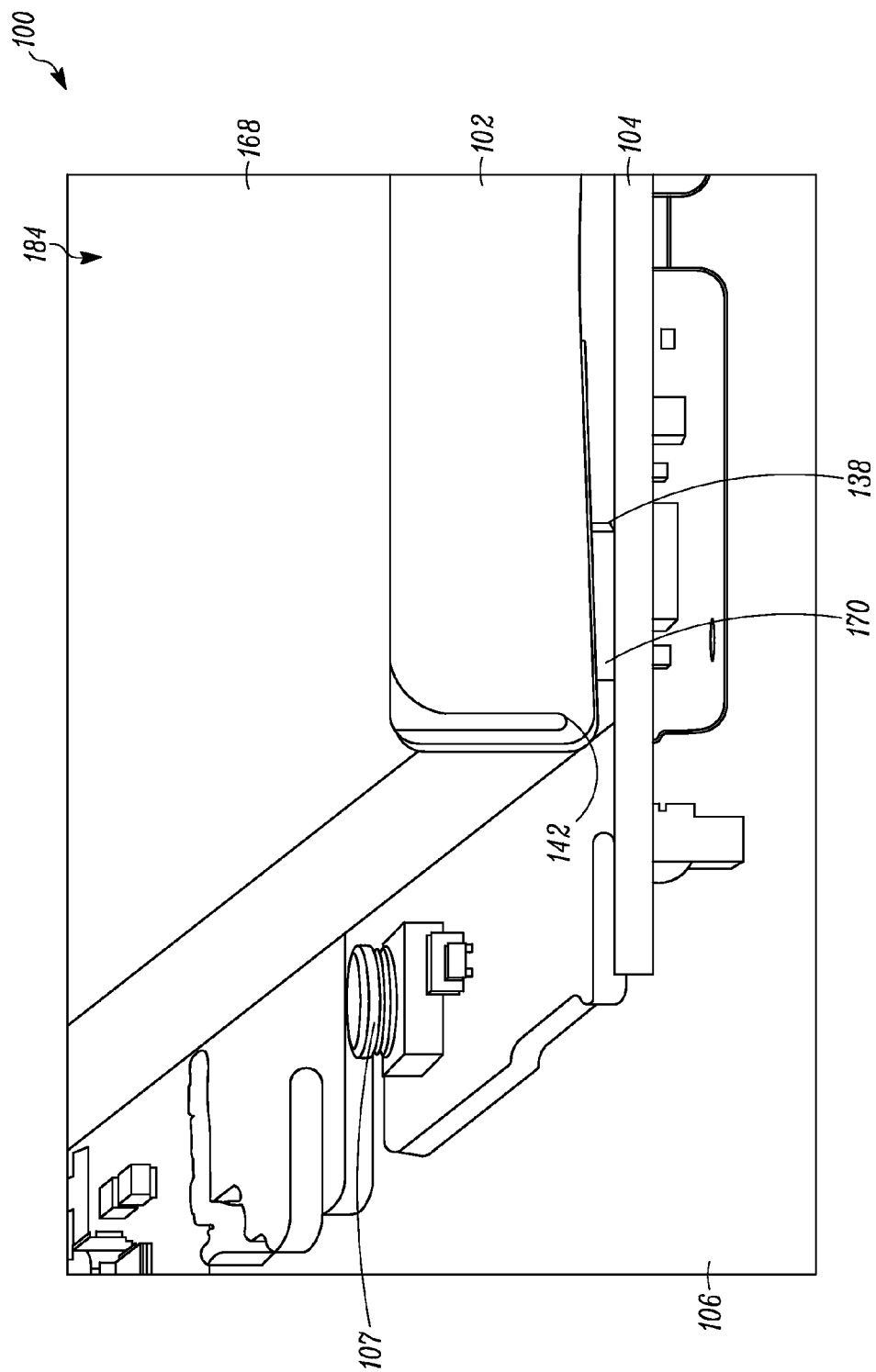
FIG. 1 is an enlarged fragmentary perspective view of a system of reducing RF energy leakage between a battery and PCB in accordance with principles of the present invention.

An improved system and method of reducing radio frequency (RF) energy leakage between a battery and printed circuit board (PCB) is provided, which is effective, economical, attractive and easy to manufacture and use. The improved system and method of reducing RF energy leakage between the battery and PCB also reduces cost, space, and encroachment into antenna volume area. Advantageously, in the improved system and method, there is little or no RF energy trapped between the battery and PCB and there are minimal or no undesired cavity resonances. Furthermore, the improved system and method provides enhanced performance and better efficiency of the electronic communications device.

The improved system and method of reducing RF energy leakage can use a conductive metal, such as aluminum foil, to wrap the edges of the battery. Electrical connectivity can be provided by metal conductors or battery foil, such as: metallic foil, strips, rails, tapes, or other conductors on the battery edges and walls perpendicular to the ground plane of the PCB.

An electrically conductive spacer can be inserted or adhered between the battery foil and the exposed PCB ground for making electrical contact between the foil and battery ground. The spacer can be a conductive foam, a spring contact soldered to the PCB at frequent intervals, a three dimensional (3D) conductive tape adhered to the battery and/or adhered to the PCB, or a conductive elastomeric material. In the illustrative embodiment, a thin, compressible, conductive foam is adhered with conductive adhesive to the conductive tape on the PCB side of the battery.

The PCB can include electrically exposed metallic ground pads for connection to the metallic foil. In the illustrative embodiment, the PCB can comprise exposed gold located where the conductive foam can touch the PCB to enable a solid grounding contact continuously along the entire length of the battery. This arrangement helps prevents RF energy from entering or being trapped in the cavity between the battery and the PCB.

This improved system and method of reducing RF energy leakage can provide a RF barrier wall or pseudo-wall constructed by virtue of: the conductive strip adhered to the battery, the conductive spacer element, and the open ground connection on the PCB. The wall can be formed by rows of elements, similar to bricks. The purpose of the pseudo-wall is to prevent RF energy from becoming trapped within the cavity between the battery and the PCB. This improved method of reducing RF energy leakage is a useful means of providing an electrical RF shield between antennas and the cavity created between a battery and the PCB.

The shape of the metal foil is not limited to the perimeter of the battery. It can be a single foil covering the entire battery area, top and/or bottom, and the foil can be folded on the sides to achieve the RF shielding. Also, the foil can include a fully metallic surrounding surface that can alternatively be used in place of the aforementioned elements. The metallic foil or conductor adhered to the battery can be: a flex PCB, a stamped metal, or a plastic housing surface plated with conductive material using LDS or vacuum deposition.

The metallic foil assembly can include other elements to allow packaging or handling features such as a liner or a pull tab for removing the battery from the electronic communications device. Any electronic device with an antenna near a battery can utilize this improved system and method of reducing RF energy leakage. This improved system and method of reducing RF energy leakage is useful for better antenna performance, especially on smartphones with decreased antenna volume.

The improved system and method of reducing RF energy leakage between a battery and a PCB in an electronic communications device, can comprise or use an electronic communications device with: at least one antenna; a PCB having at least one ground comprising a metal pad; a battery pack comprising at least one battery for energizing the PCB and a casing for at least partially enclosing and insulating the battery such that the battery pack is spaced from the PCB by a gap defining a cavity; and a RF shield assembly which can provide a RF barrier wall that can extend between and connect the battery pack and the PCB for substantially minimizing RF energy in the gap from interfering with performance of the antenna.

The RF shield assembly can comprise a metal conductor comprising one or more of the following: metallic foil, copper foil, aluminum foil, metal strips, battery foil, metal rails, conductive tape, a flexible conductor, a flexible PCB conductor, stamped metal conductor, conductive portions of a housing, a conductor plated to a housing, conductive material surface plated to a plastic housing by laser direct structuring (LDS), conductive material surface plated to a plastic housing by vacuum deposition, or combinations of any of the preceding. The conductor can further comprise: a conductor secured to a perimeter of the battery pack, a conductor secured to an edge of the battery pack, a conductor secured to a wall of the battery pack, a conductor secured to a bottom of the battery pack, a conductor secured to a top of the battery pack, a conductor covering a portion of the battery pack, a conductor substantially covering an area of the battery pack, an annular conductor surrounding a surface of the battery pack, a conductor folded onto sides of the battery pack, or a combination of any of the preceding arrangements.

The RF shield assembly can also comprise an electrically conductive spacer positioned between and connecting the conductor to the ground. The electronically conductive spacer can comprise: a conductive foam, conductive cushion, resilient spacer, compressible spacer, metal spring, metallic spring contact soldered to the metal pad, conductive tape, conductive elastomeric material, or combinations of any of the preceding electronically conductive spacers.

The battery can comprise: a single battery, battery cells, a set of batteries, or combinations thereof. In the illustrative embodiment, the battery pack comprises a pull tab secured to the casing for assisting in removing the battery pack from the electronic communications device. The RF shield assembly can be connected to the pull tab. The casing of the battery pack can comprise a liner comprising: electrical insulating material, insulating film, transparent film, film with viewable indicia thereon, film with printed matter thereon, or combinations thereof. In some circumstances, it may be desirable that the RF shield assembly be connected to the liner of the battery pack.

The metal pad of the PCB can comprise one or more electrically exposed metallic ground pads. In the illustrated embodiment, the metal pad comprises gold pads.

The electronic communications device can comprise a portable electronic device comprising one or more of the following: a radiotelephone, cellular (cell) phone, mobile phone, smart phone, qwerty phone, flip phone, slider phone, android phone, tablet phone, camera phone, clamshell device, portable networking device, portable gaming device, mobile communications device, personal digital assistant (PDA), wireless e-mail device, a two way pager, internet communication device, android tablet, ipod, ipad, kindle, electronic reading device, electronic photo frame, digital photo frame, digital picture frame, video player, audio player, electronic calculator, electronic monitor, blackberry, tablet device, video device, computer, netbook, data sharing device, wireless device, handheld electronic communications device, global positioning system (GPS), navigation device, transmitting device, electronic receiving device, electronic planner, workout planner, electronic calendar, scheduling device, music player, MP3 player, performance monitor, golf tracker, incoming call notifier, answering machine, statistical storage device, data storage device, information storage device, cadence sensor, goal setting device, fitness tracker, exercise monitor, sports monitor, workout frequency monitor, downloadable device, computer, Bluetooth compatible device, data sharing device, and a hand held electronic device.

The improved system of reducing RF energy leakage between a battery and a PCB in an electronic communications device, as set forth in the patent claims hereafter has achieved unexpected surprisingly good results.

The following is a detailed description and explanation of the preferred embodiments of the invention and best modes for practicing the invention.

Referring to the drawings, an electronics communications system 100 (FIGS. 1, 3 and 4) provides a system and method of reducing radio frequency (RF) energy leakage between a battery 102 (FIGS. 1, 3, 4, and 8) and a printed circuit board (PCB) 104 (FIGS. 1, 3 and 4) in an electronic communications device 106 (FIGS. 1, 3, 4 and 7). The PCB can have electrical components 107 (FIG. 1) thereon. The electronic communications device can be operable for mobile phone communications. The electronic communications device can be moveable and pivotable from a landscape orientation mode (landscape mode or landscape orientation) to a portrait orientation mode (portrait mode or portrait orientation) and vice versa.

Figure 7:
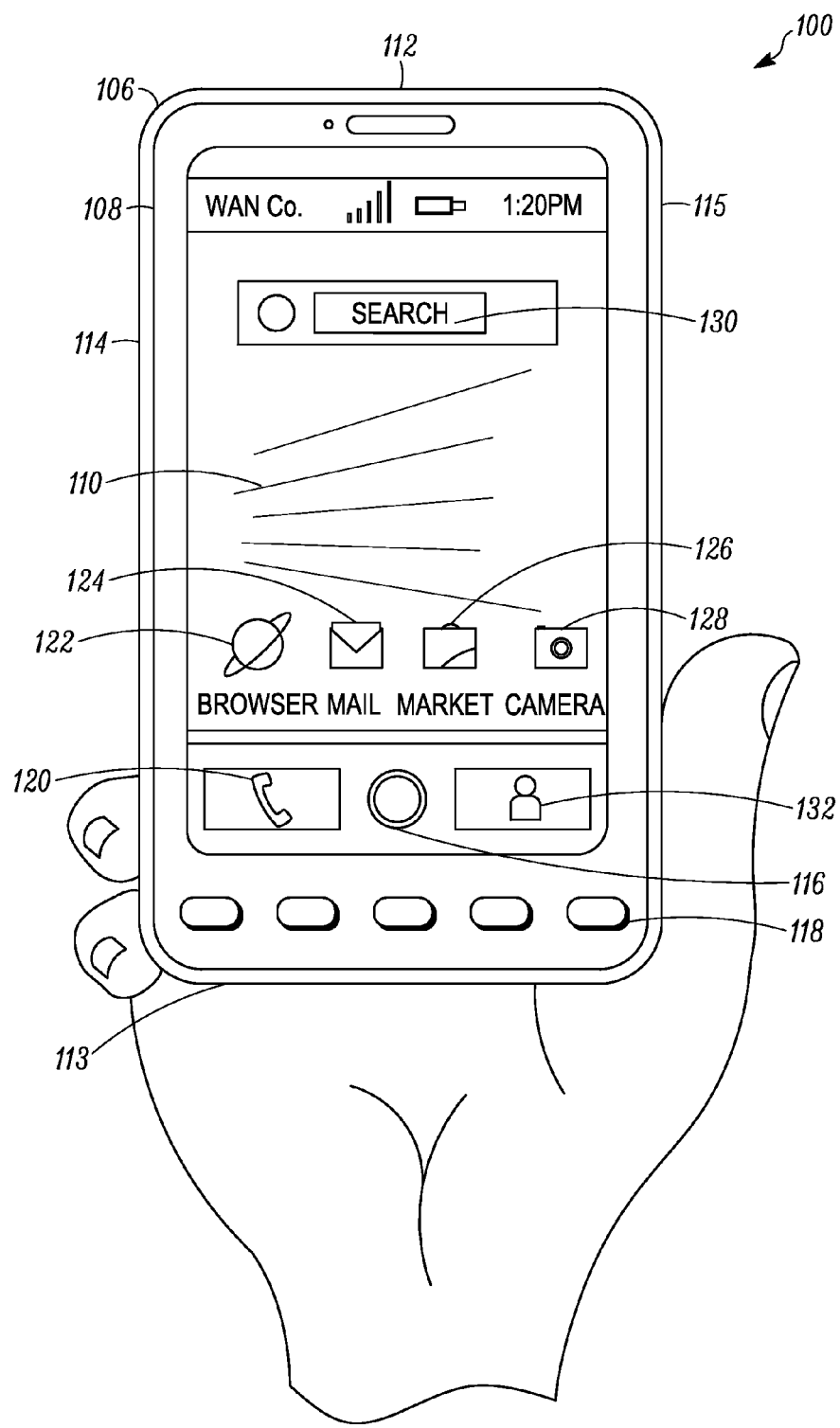
FIG. 7 is front view of a handheld electronic communications device of a system of reducing RF energy leakage between the battery and PCB in accordance with principles of the present invention.
Figure 8:
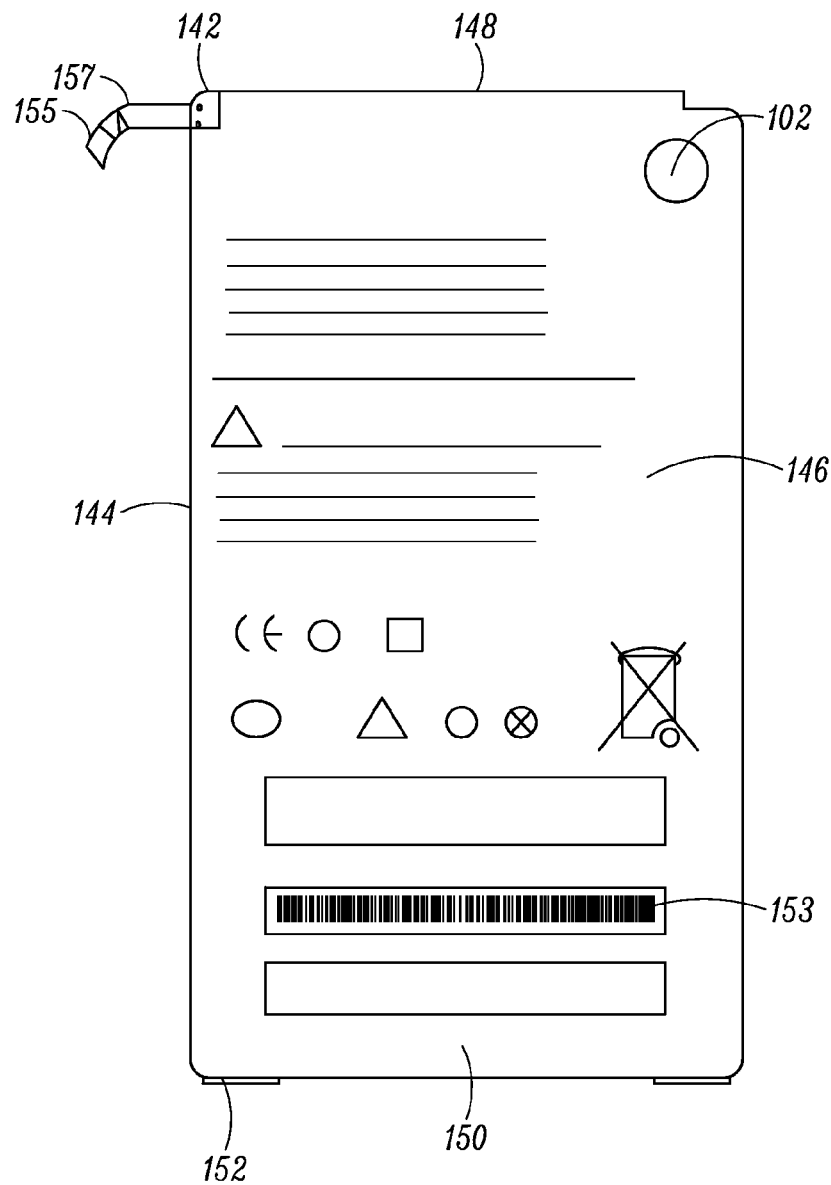
FIG. 8 is a front view of a battery pack without a pull tab attached to a casing for a battery for use in a system of reducing RF energy leakage between the battery and PCB in accordance with principles of the present invention.

As shown in FIG. 7, the mobile electronic communications device can have a display module and a chassis which can comprise a modular housing assembly with a modular housing 108 to securely hold the display module. The display module can comprise an electronic visual display 110 for displaying images. The electronic visual display can comprise an elongated, generally rectangular display lens. The display lens can comprise a user interface (UI) and can have a touch sensitive haptic elongated front lens surface. The display lens can comprise: a glass lens, transparent lens, touch sensitive lens, haptic lens, screen, impact-resistant screen, display screen, touchscreen, screen with an accelerator, monitor, light emitting display, or combinations of any of the preceding. The touch sensitive surface of the lens can have touch sensors which generate a signal in response to a manually engageable haptic input from a user when the user touches the touch sensitive surface of the lens with a finger. Touch sensors can be located behind the front surface of the lens or behind the back surface of the lens. The user interface and a display module can comprise a light emitting display for emitting light forming an image on the lens in response to the signal. The display module can also have piezoelectric elements that can provide haptics with direct piezoelectric bending action for allowing substantial transfer of mechanical vibration energy.

The modular housing assembly can have a front housing section, a back housing section and rounded corners. The modular housing can have substantially parallel lateral edges 112 and 113 (FIG. 7) and substantially parallel front longitudinal edges 114 and 115 which can extend between and integrally connect the front lateral housing-edges. The back housing can provide a rearward housing with a back surface which can comprise the back of the modular housing assembly and electronic communications device.

The mobile electronic communications device can have various control buttons 116 (FIG. 7) including volume control buttons and operating keys 118, such as along one of the sides or ends of the electronic communications device. The control buttons can include an on-off power button, a sleep mode button, an airplane mode button, or combinations thereof. The mobile electronic communications device can also include various program applications capable of operating at normal or rapid data rate communications. The applications can be represented by different icons. Examples of such applications can include, but are not limited to: a cellular telephone application 120, mobile web browser application 122, e-mail application 124, stock market and/or internet shopping application 126, camera application 128, internet search application 130, and/or social media application 132.

The mobile electronic communications device can have one or more antenna feed or launch pads 134 and 135 (FIGS. 3 and 4) for antennas 137 and 139 transmitting and receiving electrical RF signals comprising RF energy. The antennas can be connected and/or grounded to the PCB via the feed or launch pads. The antennas can comprise one or more of the following or combinations thereof: RF antenna, wide area network (WAN) antenna, local area network (LAN) antenna, global positioning system (GPS) antenna, WiFi antenna, Bluetooth antenna, multi-mode antenna, multiple-input/multiple output (MIMO) antenna, multi-band folded inverted conformal antenna, diversity antenna, and/or internal antenna.

Figure 3:
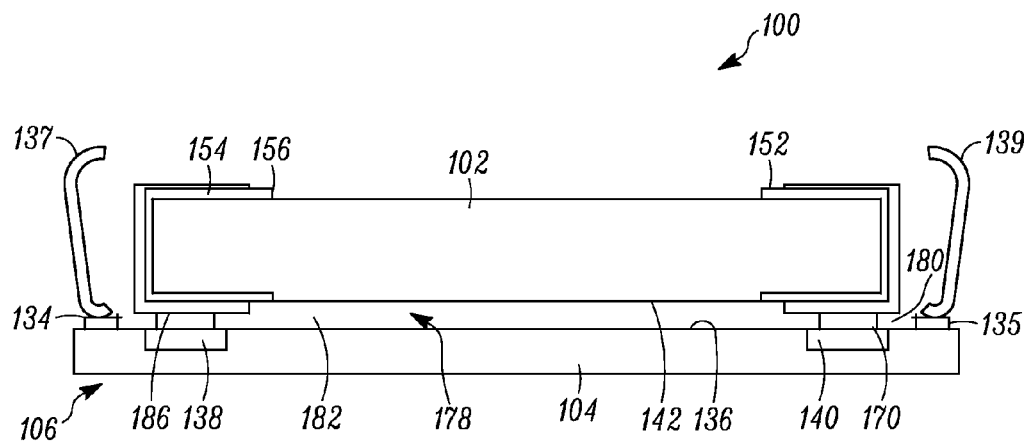
FIG. 3 is a diagrammatic end view of the system of reducing RF energy leakage between the battery and PCB in accordance with principles of the present invention.
Figure 4:
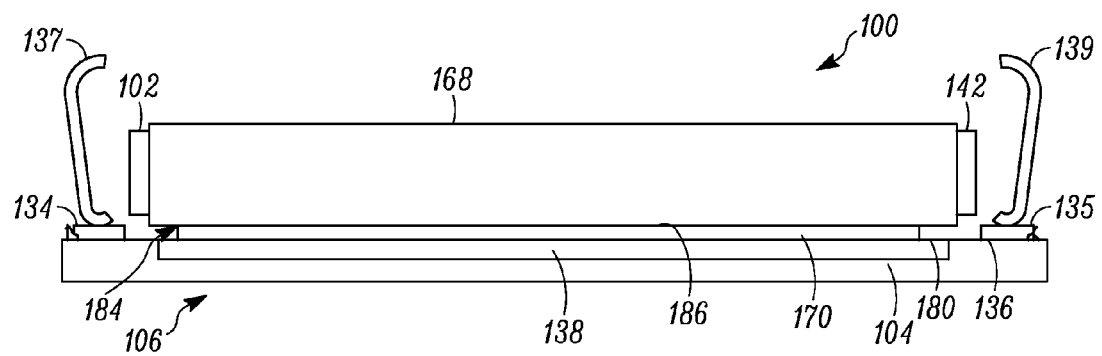
FIG. 4 is a diagrammatic side view of the system of reducing RF energy leakage between the battery and PCB in accordance with principles of the present invention.

Positioned in proximity to the antenna(s) can be one or more PCBs. The PCB can have a ground along a ground plane 136 (FIGS. 3 and 4). The ground can comprise metallic ground pads 138 and 140, such as gold ground pads. The PCB can comprise: a rigid PCB, a flexible PCB, a single-sided PCB, a double-sided PCB, a multi-layered PCB, or combinations thereof.

Figure 9:
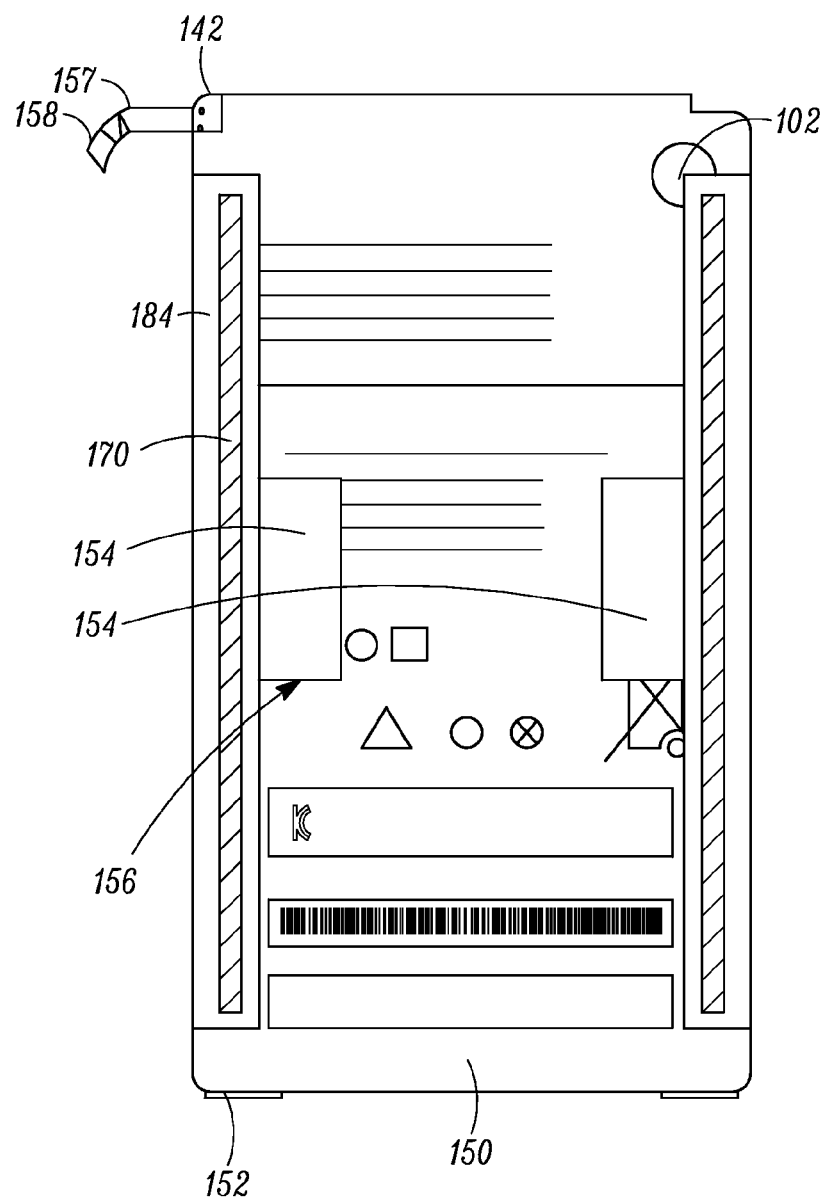
FIG. 9 is a front view of a battery pack with a pull tab attached to a case, and to conductive wrap and foam of a RF shield assembly for use in a system of reducing RF energy leakage between the battery and PCB in accordance with principals of the present invention.
Figure 10:
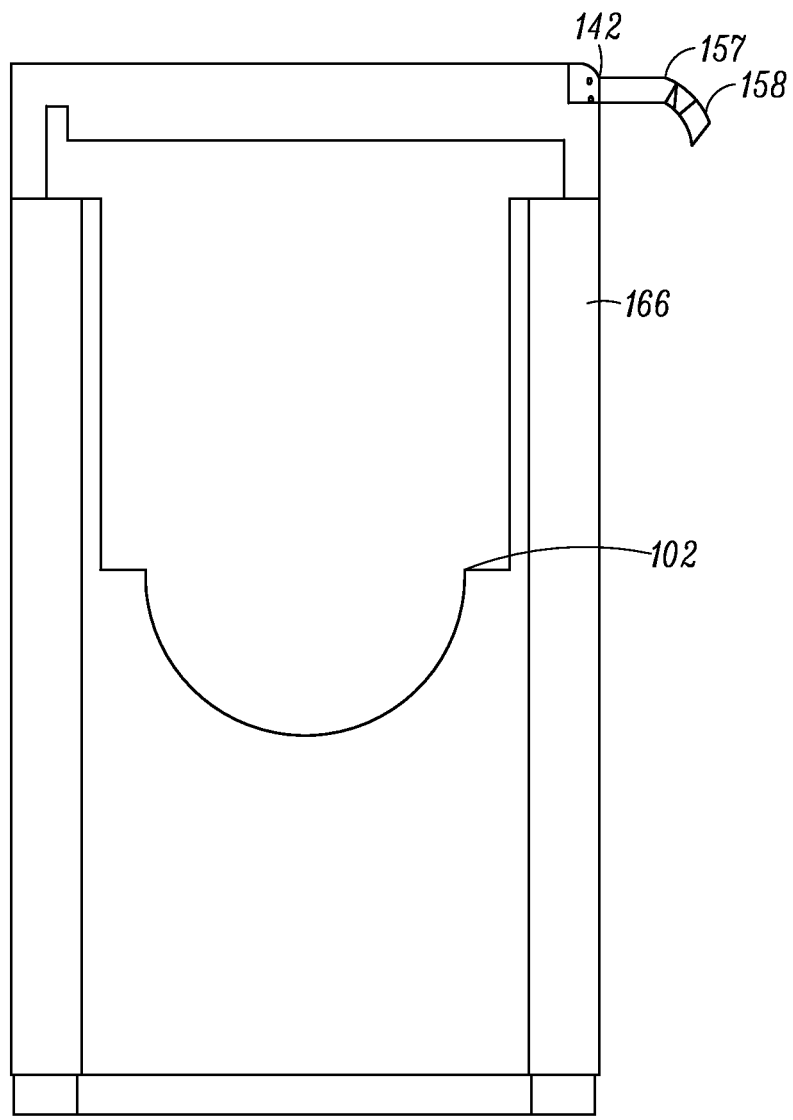
FIG. 10 is a back view of a battery pack with a pull tab attached to a case, and to conductive wrap and foam of a RF shield assembly for use in a system of reducing RF energy leakage between the battery and PCB in accordance with principals of the present invention.

A battery pack 142 (FIG. 8) can be positioned in proximity to and spaced from the antenna for energizing and powering the PCB and the antenna(s). The battery pack can include a generally rectangular battery providing a battery cell with longitudinal edges 144 and 146 and lateral edges 148 and 150 extending between and connected to the longitudinal edges. The battery can comprise a cadmium or lithium battery. The battery pack can have a plastic casing 152 comprising an insulating wrapper providing an electrically insulating liner positioned about, encasing and insulating the battery. The wrapper can have printing, logos, indentifying information, one or more bar codes and/or other indicia 153 thereon. The battery pack can have a battery connector 155 and a battery flex 157. The battery pack can also have one or more finger graspable plastic pull tabs 154 (FIG. 9) of a battery pull tab assembly 156 (FIGS. 2, 3 and 9) secured to the casing for assisting in pulling and removing the battery pack from the electronic communications device.

Figure 2:
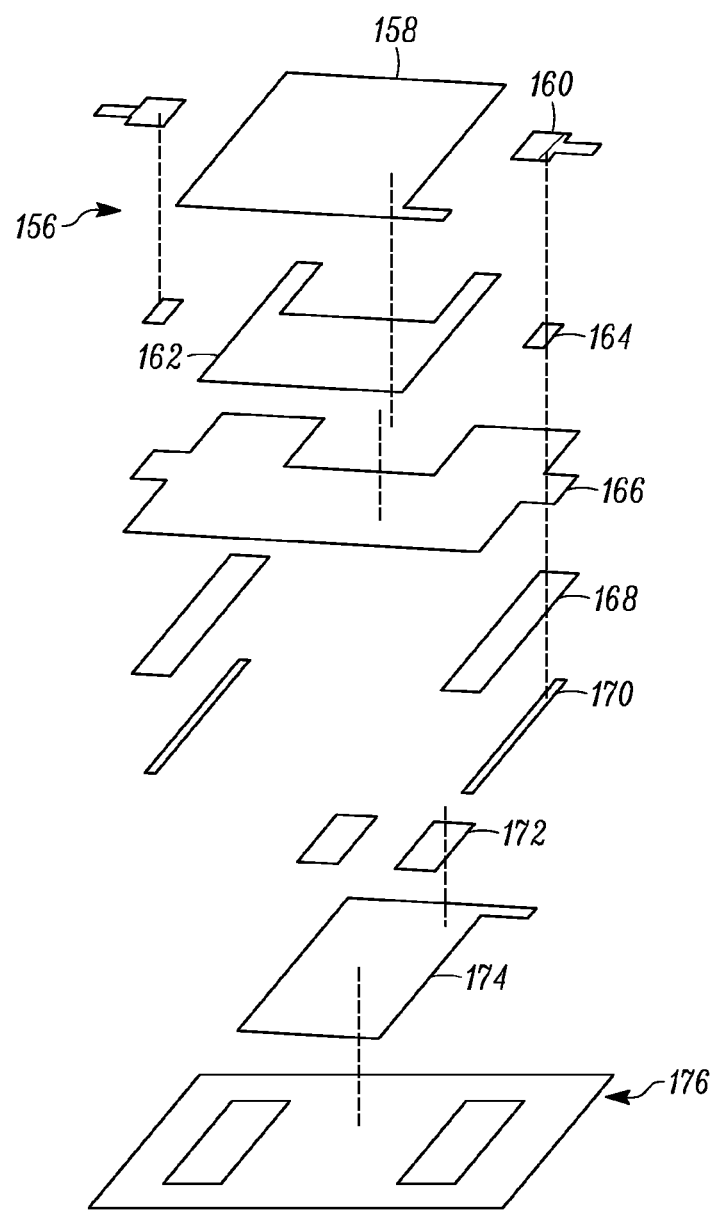
FIG. 2 is an exploded view of a battery pull tab assembly for use in the system and method of reducing RF energy leakage between the battery and PCB in accordance with principles of the present invention.

As shown in the exploded view of the battery pull tab assembly of FIG. 2, the battery pull tab assembly can comprise: a pull tab adhesive liner 158, pull tab wing adhesive liners 160, battery adhesive 162 and 164, a pull tab layer 166, conductive tape or foil 168 providing a conductive wrap, conductive cushions 170 comprising conductive foam, as well as inlay adhesives 172, a secondary liner 174, and a primary liner 176.

As shown in FIG. 3, a gap 178 can provide a cavity and space between the battery and the PCB. The gap can be uniform or a non-uniform variable gap. The gap (cavity) can include openings providing end openings 180 comprising open ends positioned in proximity to the lateral edges of the battery and can provide side openings 182 (FIG. 3) comprising open sides positioned in proximity to the longitudinal edges of the battery.

A RF shield assembly 184 (FIGS. 3 and 4) providing a RF impermeable barrier can extend between and connect the pull tab of the battery pack to the metallic ground pad on the PCB for substantially minimizing RF energy from being trapped in the cavity (gap) to substantially minimize cavity resonances at undesired frequencies and degradation of antenna performance. The RF shield assembly can comprise a conductive wrap 168 comprising a flexible metal conductor connected to the pull tab and conductive spacer 170 comprising compressible conductive foam positioned between and electrically connecting the flexible metal conductor to at least one of the metallic ground pads. Preferably, the spacer can comprise an elastomeric conductive spacer and the RF shield assembly can include conductive adhesive 186 for connecting the conductive foam to the conductive wrap. Desirably, the RF shield assembly can provide a solid grounding contact continuous along a length of the battery. In the illustrative embodiment, the RF shield assembly comprises a RF impervious shield that can extend between, cover, block, plug and close at least one of the openings in the gap (cavity). Furthermore, the RF impervious shield can abut against and block the side openings (open sides) and/or end openings (open ends) of the gap between the battery and the PCB.

The conductive wrap or conductor can comprise: metallic foil, aluminum foil, copper foil, a flexible PCB conductor, or combinations of any of the preceding conductive foil and wraps.

In the preferred embodiment, the mobile electronics communications device can comprise: a portable handheld electronic device, such as: a radiotelephone, cellular (cell) phone, mobile phone, smart phone, qwerty phone, flip phone, slider phone, android phone, tablet phone, camera phone, clamshell device, portable networking device, mobile computing device, mobile electronic processor, mobile computer, personal digital assistant (PDA), wireless e-mail device, two way pager, internet communication device, android tablet, ipod, ipad, kindle, electronic reading device, or combinations of any of the preceding.

Figure 5:
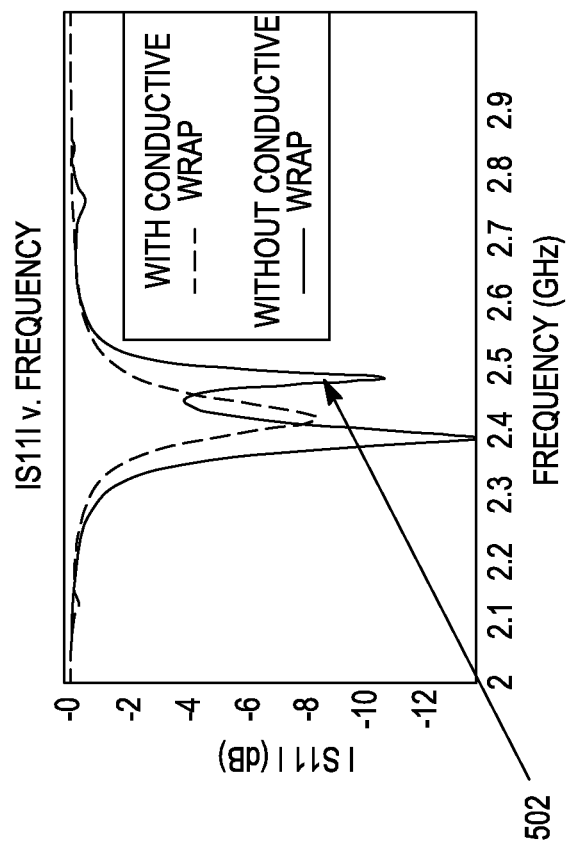
FIG. 5 is a graph comparing the return loss for a bluetooth antenna in a conventional system with and without conductive wrap with the novel system using conductive wrap for reducing RF energy leakage between the battery and PCB in accordance with principles of the present invention.

FIG. 5 is a graph providing a chart comparing the return loss for a bluetooth antenna in a conventional system without conductive wrap with the novel electronic communications system using conductive wrap for reducing RF energy leakage between the battery and PCB. The graph of FIG. 5 clearly illustrates undesired cavity resonance 502 toward the high end of the bluetooth band in a conventional system and minimal and substantially less return loss in a bluetooth antenna in the novel communications system using conductive wrap for reducing RF energy leakage in the gap between the battery and PCB.

Figure 6:
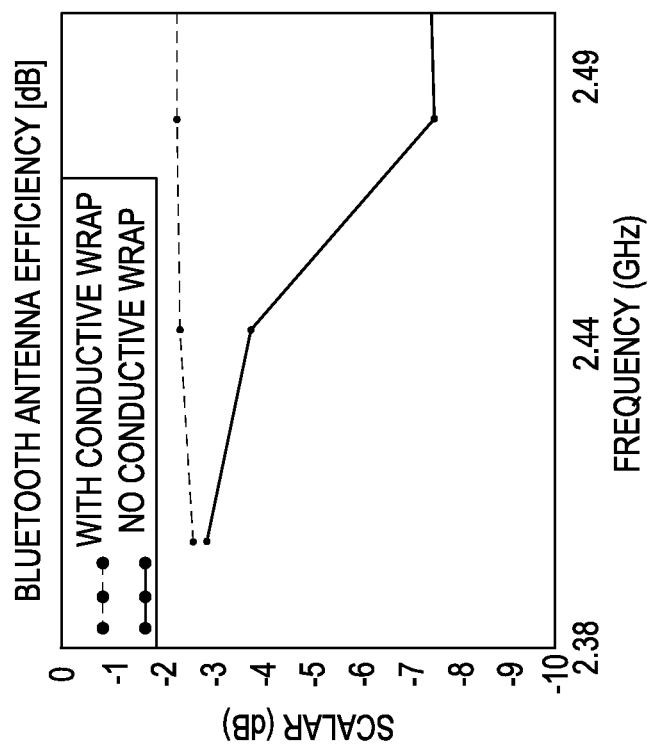
FIG. 6 is a graph comparing the radiation efficiency in a conventional system with and without conductive wrap with the novel system using conductive wrap for reducing RF energy leakage between the battery and PCB in accordance with principles of the present invention.

FIG. 6 is a graph providing a chart comparing the radiation efficiency in a conventional system without conductive wrap with the novel electronic communications system using conductive wrap for reducing RF energy leakage between the battery and PCB. The graph of FIG. 6 clearly illustrates significant decrease in radiation efficiency and undesired cavity resonance toward the high end of the bluetooth band in a conventional system which was caused by RF energy leakage under the battery. In comparison, the graph of FIG. 6 illustrates a generally steady, constant and excellent radiation efficiency with virtually no RF energy leakage under the battery in the novel communications system using conductive wrap for reducing RF energy leakage in the gap between the battery and PCB.

Among the many advantages of the improved system and method of reducing RF energy leakage between a battery and a PCB in an electronic communications device are:
1. Superior capability.
2. Superb performance.
3. Decreased RF energy leakage between the battery and PCB.
4. Reduced encroachment into the antenna volume area.
5. Prevents RF energy from being trapped between the battery and PCB.
6. Eliminates undesired cavity resonances.
7. Decreases unused interior space.
8. Compact.
9. Reliable.
10. Safe.
11. Reduces costs.
12. User friendly.
13. Easy to manufacture and use.
14. Durable.
15. Economical.
16. Attractive.
17. Efficient.
18. Effective.

Although embodiments of the invention have been shown and described, it is to be understood that various modifications, substitutions, and rearrangements of parts, components, and/or process (method) steps, as well as other uses of the improved system and method of reducing RF energy leakage between a battery and a PCB in an electronic communications device can be made by those skilled in the art without departing from the novel spirit and scope of this invention.

What is claimed is:

1. A system of reducing radio frequency (RF) energy leakage between a battery and printed circuit board (PCB) in an electronic communications device, comprising:
   an electronic communications device having:
      at least one antenna;
      a PCB having at least one ground comprising a metal pad;
      a battery pack comprising at least one battery for energizing said PCB and a casing for at least partially enclosing and insulating said battery;
      said battery pack being spaced from said PCB and defining a gap between said battery pack and said PCB; and
      a RF shield assembly providing a RF barrier wall extending between and connecting said battery pack and said PCB for substantially minimizing RF energy in said gap from interfering with performance of said antenna, wherein:
         said battery pack comprises a pull tab secured to said casing for assisting in removing said battery pack from said electronic communications device; and
         said RF shield assembly is connected to said pull tab.

2. A system for reducing RF energy leakage between a battery and PCB in an electronic communications device in accordance with claim 1 wherein said RF shield assembly comprises a metal conductor selected from the group consisting of: metallic foil, copper foil, aluminum foil, metal strips, battery foil, metal rails, conductive tape, a flexible conductor, a flexible PCB conductor, a stamped metal conductor, conductive portions of a housing, a conductor plated to a housing, conductive material surface plated to a plastic housing by laser direct structuring (LDS), conductive material surface plated to a plastic housing by vacuum deposition, and combinations of any of the preceding.

3. A system for reducing RF energy leakage between a battery and PCB in an electronic communications device in accordance with claim 2 wherein said RF shield assembly further comprises an electrically conductive spacer positioned between and connecting said conductor to said ground.

4. A system for reducing RF energy leakage between a battery and PCB in an electronic communications device in accordance with claim 3 wherein said spacer is selected from the group consisting of: a conductive foam, conductive cushion, resilient spacer, compressible spacer, metal spring, metallic spring contact soldered to said metal pad, conductive tape, conductive elastomeric material, and combinations of any of the preceding.

5. A system for reducing RF energy leakage between a battery and PCB in an electronic communications device in accordance with claim 2 wherein:
   said conductor is selected from the group consisting of: a conductor secured to a perimeter of said battery pack, a conductor secured to an edge of said battery pack, a conductor secured to a wall of said battery pack, a conductor secured to a bottom of said battery pack, a conductor secured to a top of said battery pack, a conductor covering a portion of said battery pack, a conductor substantially covering an area of said battery pack, an annular conductor surrounding a surface of said battery pack, a conductor folded onto sides of said battery pack, and combinations of any of the preceding; and
   said battery is selected from the group consisting of: a single battery, battery cells, a set of batteries, and combinations thereof.

6. A system for reducing RF energy leakage between a battery and PCB in an electronic communications device in accordance with claim 1 wherein:
   said casing comprises a liner selected from the group consisting of: electrical insulating material, insulating film, transparent film, film with viewable indicia thereon, film with printed matter thereon, and combinations thereof; and
   said RF shield assembly is connected to said liner.

7. A system for reducing RF energy leakage between a battery and PCB in accordance with claim 1 wherein said metal pad comprises an electrically exposed metallic ground pad.

8. A system for reducing RF energy leakage between a battery and PCB in an electronic communications device in accordance with claim 1 wherein metal pad comprises a gold pad.

9. A system for reducing RF energy leakage between a battery and PCB in an electronic communications device in accordance with claim 1 wherein said electronic communications device comprises a portable electronic device selected from the group consisting of: a radiotelephone, cellular (cell) phone, mobile phone, smart phone, qwerty phone, flip phone, slider phone, android phone, tablet phone, camera phone, clamshell device, portable networking device, portable gaming device, mobile communications device, personal digital assistant (PDA), wireless e-mail device, a two way pager, internet communication device, android tablet, ipod, ipad, kindle, electronic reading device, electronic photo frame, digital photo frame, digital picture frame, video player, audio player, electronic calculator, electronic monitor, blackberry, tablet device, video device, computer, netbook, data sharing device, wireless device, handheld electronic communications device, global positioning system (GPS), navigation device, transmitting device, electronic receiving device, electronic planner, workout planner, electronic calendar, scheduling device, music player, MP3 player, performance monitor, golf tracker, incoming call notifier, answering machine, statistical storage device, data storage device, information storage device, cadence sensor, goal setting device, fitness tracker, exercise monitor, sports monitor, workout frequency monitor, downloadable device, computer, Bluetooth compatible device, data sharing device, handheld electronic device, and combinations of any of the preceding.

10. A system of reducing radio frequency (RF) energy leakage between a battery and printed circuit board (PCB) in an electronic communications device, comprising:
an electronic communications device, comprising
at least one internal antenna for emitting and/or receiving RF energy comprising RF signals;
at least one PCB having at least one metallic ground pad;
at least one a battery package positioned in proximity to said antenna for powering said PCB and said antenna, said battery package comprising at least one battery and a battery-case for at least partially enclosing and insulating said battery;
said battery package being spaced from said PCB and defining a gap providing a cavity between said battery package and said PCB; and
a RF shield assembly providing a RF impermeable barrier extending between and connecting said battery package to said metallic ground pad on said PCB for substantially minimizing RF energy in said cavity from interfering with performance of said antenna;
said RF shield assembly comprising
a flexible metal conductor connected to said battery package; and
conductive foam comprising at least one conductive spacer positioned between and electrically coupling said flexible metal conductor to said metallic ground pads.

11. A system for reducing RF energy leakage between a battery and PCB in an electronic communications device in accordance with claim 10 wherein said flexible metal conductor is selected from the group consisting of: metallic foil, copper foil, aluminum foil, a flexible PCB conductor, and combinations of any of the preceding.

12. A system for reducing RP energy leakage between a battery and PCB in an electronic communications device in an electronic communications device in accordance with claim 10 wherein said antenna is selected from the group consisting of: a RF antenna, wide area network (WAN) antenna, local area network (LAN) antenna, global positioning system (GPS) antenna, WiFi antenna, Bluetooth antenna, multi-mode antenna, multiple-input/multiple output (MIMO) antenna, multi-band folded inverted conformal antenna, diversity antenna, internal antenna, and combinations of any of the preceding antennas.

13. A system for reducing RF energy leakage between a battery and PCB in an electronic communications device in accordance with claim 10 wherein said battery package comprises a pull tab secured to said battery-case for assisting in removing said battery package from said electronic communications device; and said RF shield assembly is connected to said pull tab.

14. A system for reducing RF energy leakage between a battery and PCB in an electronic communications device in accordance with claim 10 wherein said electronic communications device comprises a portable electronic device selected from the group consisting of: a radiotelephone, cellular (cell) phone, mobile phone, smart phone, qwerty phone, flip phone, slider phone, android phone, tablet phone, camera phone, clamshell device, portable networking device, mobile communications device, personal digital assistant (FDA), wireless e-mail device, two way pager, internet communication device, android tablet, ipod, ipad, kindle, electronic reading device, handheld electronic device, and combinations of any of the preceding.

15. A system of reducing radio frequency (RF) energy leakage between a battery and printed circuit board (PCB) in an electronic communications device, comprising:
an electronic communications device, comprising
at least one internal RF antenna for receiving and/or transmitting RF signals comprising RF energy;
at least one PCB having a ground along a ground plane, said ground comprising metallic ground pads, and said PCB positioned in proximity to said RF antenna;
a battery pack positioned in proximity to and spaced from said antenna for energizing and powering said PCB and said antenna, said battery pack having a generally rectangular battery providing a battery cell with longitudinal edges and lateral edges extending between and connected to said longitudinal edges, said battery pack having a plastic casing comprising an insulating wrapper providing a electrically insulating liner positioned about, encasing and insulating said battery, and said battery pack having a finger graspable plastic pull tab secured to said casing for assisting in pulling and removing said battery pack from said electronic communications device;
a gap providing a cavity spaced between said battery and said PCB, said cavity defining openings providing end openings comprising open ends positioned in proximity to said lateral edges and providing side openings comprising open sides positioned in proximity to said longitudinal edges; and
a RF shield assembly providing a RF impermeable bather extending between and connecting said pull tab to said metallic ground pad on said PCB for substantially minimizing RF energy from being trapped in said cavity to substantially minimize cavity resonances at undesired frequencies and substantially minimize degradation of antenna performance;
said RF shield assembly comprising
a conductive wrap comprising a flexible metal conductor connected to said pull tab; and
a conductive spacer comprising compressible conductive foam positioned between and electrically connecting said flexible metal conductor to at least one of said metallic ground pads.

16. A system for reducing RF energy leakage between a battery and PCB in an electronic communications device in accordance with claim 15 wherein:
said spacer comprises an elastomeric conductive spacer;
said metallic ground pads comprise gold;
RF shield assembly includes conductive adhesive for connecting said conductive foam to said conductive wrap; and said RF shield assembly provides a solid grounding contact substantially continuously along a length of said battery.

17. A system for reducing RF energy leakage between a battery and PCB in an electronic communications device in accordance with claim 15 wherein:
   said RF shield assembly comprises a RE impervious shield extending between, covering, blocking plugging and closing at least one of said openings; and
   said RF impervious shield is selected from the group consisting of: a RF shield abutting against and blocking said side openings, a RF shield abutting against and blocking said end openings, and combinations thereof.

18. A system for reducing RF energy leakage between a battery and PCB in an electronic communications device in accordance with claim 15 wherein said conductive wrap is selected from the group consisting of: metallic foil, aluminum foil, copper foil, a flexible PCB conductor, and combinations of any of the preceding.

19. A system for reducing RF energy leakage between a battery and PCB in an electronic communications device in accordance with claim 15 wherein:
   said electronic communications device comprises a portable handheld electronic device selected from the group consisting of: a radiotelephone, cellular (cell) phone, mobile phone, smart phone, qwerty phone, flip phone, slider phone, android phone, tablet phone, camera phone, clamshell device, portable networking device, mobile communications device, personal digital assistant (PDA), wireless e-mail device, two way pager, internet communication device, android tablet, ipod, ipad, kindle, electronic reading device, and combinations of any of the preceding;
   said antenna is selected from the group consisting of: a RE antenna, wide area network (WAN) antenna, local area network (LAN) antenna, global positioning system (GPS) antenna, WiFi antenna, Bluetooth antenna, multimode antenna, multiple-input/multiple output (MIMO) antenna, multi-band folded inverted conformal antenna, diversity antenna, internal antenna, and combinations of any of the preceding antennas; and
   said PCB is selected from the group consisting of: a rigid PCB, a flexible PCB, a single-sided PCB, a double-sided PCB, a multi-layered PCB, and combinations thereof.

* * * * *